April 8, 1924.
J. E. MORTON
LIQUID LEVEL GAUGE
Filed Sept. 29, 1922
1,489,957
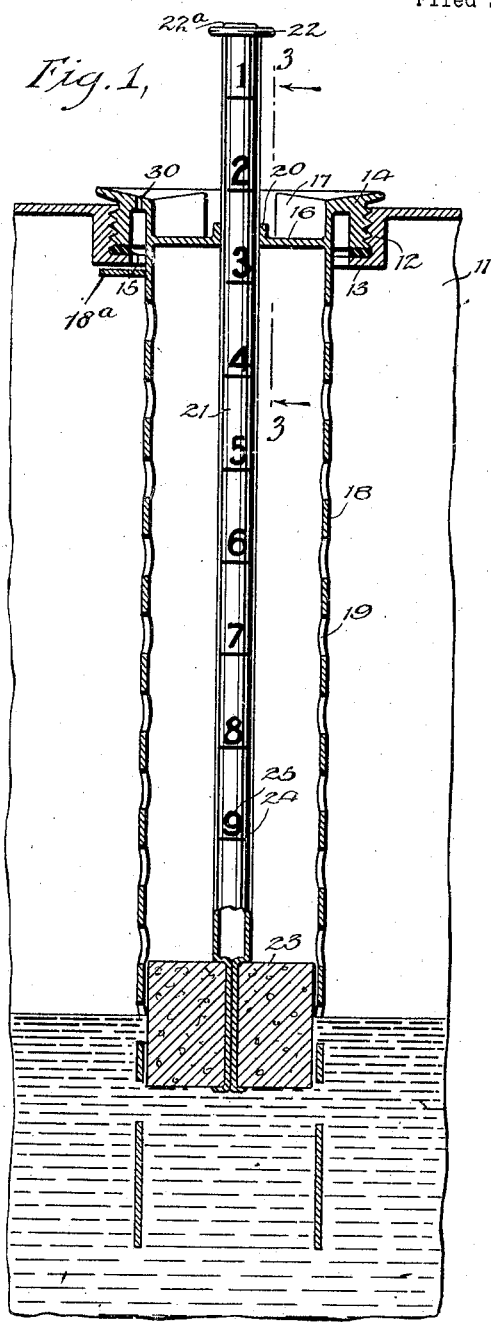
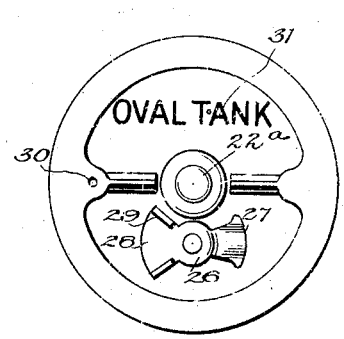
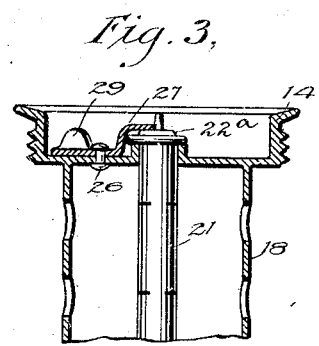
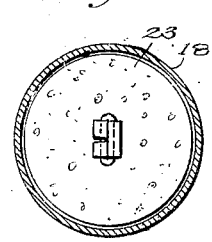
INVENTOR
J. E. Morton
BY
ATTORNEYS Patented Apr. 8, 1924.                                                          1,489,957

UNITED STATES PATENT OFFICE.

JAMES E. MORTON, OF MEMPHIS, TENNESSEE, ASSIGNOR TO WILLIAM A. WEBSTER, OF MEMPHIS, TENNESSEE.

LIQUID-LEVEL GAUGE.

Application filed September 29, 1922. Serial No. 591,330.

*To all whom it may concern:*

Be it known that I, JAMES E. MORTON, a citizen of the United States, and a resident of Memphis, in the county of Shelby and State of Tennessee, have invented a new and Improved Liquid-Level Gauge, of which the following is a full, clear, and exact description.

This invention relates to gauges, and has reference more particularly to a device of this kind for determining the depths or quantities of fluids in tanks. The invention also relates to a gauge which comprises a barrel, a float slidably disposed therein, a gauge rod associated with the float and having indicating graduations and movable with the float. More specifically, the invention relates to a gauge as above defined, which is provided with means for locking the gauge rod or other corresponding movable member in a fixed position when it is not in use.

An object of the invention is to provide a simple, inexpensive and efficient gauge, which may be used with the fuel tanks of automobiles, motor boats, or for other purposes, which will be operative at all times, by means of which the contents of the tank can be instantly ascertained, and in which the movable indicating member may be securely locked in position when it is not in use.

A further object of the invention is to provide a gauge of the kind in question, which may be read in the darkness, which will not in any way interfere with the expeditious filling of the tank, and which can be very easily manipulated.

With these and other objects in view the invention consists in certain novel features of construction, and combinations and arrangements of parts, as will be more fully hereinafter described and pointed out in the claim.

In the accompanying drawings—

Figure 1 is a vertical section of an embodiment of my invention;

Figure 2 is a plan view of the gauge;

Figure 3 is a fragmentary vertical section of the upper portion of the gauge, showing certain of the parts in different positions; and Figure 4 is an inverted transverse section of the gauge.

Before proceeding to a more detailed explanation of the invention, it should be clearly understood that, while the gauge is particularly useful in connection with the fuel tanks of automobiles and the like, it can also be advantageously employed for other tanks or receptacles, the contents of which it is desirable to ascertain from time to time. Many of the details of construction form no part of the invention and may be varied in accordance with individual preference and special conditions without departing from the spirit of the invention.

Referring more particularly to the drawings, I have shown, for example, the form of tank such as is commonly employed in automobiles. The tank 11 has an opening provided with an inwardly extending collar 12 having a lateral annular flange 13 and internally threaded. The filler cap 14 is correspondingly threaded and adapted to be screwed into the opening to close the tank. A suitable gasket 15, securely to seal the opening, is placed between the flange 13 and the filler cap. The latter has a central depression 16, into which extends a pair of oppositely disposed wings 17, by means of which the filler cap may be screwed into place or unscrewed. If desired or necessary, a suitable tool may be employed for the purpose.

Permanently associated with the filler cap and, for example, integral therewith, is a downwardly extending cylindrical gauge tube 18 having a plurality of perforations 19. The gauge tube is of substantial length and when the filler cap is in place, extends to a point near the bottom of the tank. Near its lower end the number of the perforations 19 is augmented. Slidably mounted within the gauge tube and extending through a central collared opening 20 of the cap is a gauge rod 21. This gauge rod is preferably of tubular form and has a flat laterally extended head 22. At its lower end the rod is flattened and passes through an opening provided for the purpose in a float 23. This float may be of any suitable form and may, for example, consist of a cork disk. The lower ends of the flattened rod section are laterally clinched securely to attach the rod to the float. On the rod are graduations 24, together with indicating numbers 25 or other symbols. It will be understood that the graduations are so designed that they indicate according to the depth of the liquid in the tank, the quantity of this liquid. Preferably the graduations are deeply marked into the rod or are filled with a hard substance, such as enamel, in order that they may be read in the dark by touch.

Pivotally mounted upon the filler cap within the depressed part 16 thereof is a detent or lock 26 having a nose 27 upwardly offset. Opposite to the nose the detent has an extension 28 and manipulating flanges 29, so that it may be swung to one side or the other. It will be seen that when it is desired to lock the gauge in an inoperative position, the gauge rod is depressed until the nose 27 of the detent can be swung over the head 22. The detent will then serve to hold the rod in position, as shown in Figure 3. On the release of the detent, the rod, under the influence of the float, will move upwardly through the collared opening 20 to indicate the depth or quantity of fluid in the tank.

I prefer to provide the filler cap with the usual vent opening 30 to permit the escape of accumulated gases within the tank. I also provide the cap with a suitable designation 31 marked or inscribed thereon, to indicate the kind or particular tank with which the cap and the associated gauge is used.

In order to prevent the gasoline from splashing out through the vent opening 30, the barrel 18 is provided with a lateral lip or extension 18ª located near the lower end of the vent opening and spaced therefrom to permit passage of air. The extension 18ª acts as a guard to prevent gasoline from inadvertently escaping.

The detent may be of any suitable form, though I prefer to provide the head 22 of the gauge rod with a central post 22ª, over which the nose 27ª which is slightly curved and has upwardly disposed edges, rides, so that it is in effect locked in position to hold the gauge rod depressed and secure against undesired lateral displacement.

I claim:

A liquid level gauge comprising, in combination with a tank having an inlet, a filler cap for removably fitting said inlet and having a vent for the tank, a cylindrical and perforated tube extending down from said filler cap inwardly of the vented portion, a lateral lip extending from said tube beneath the vent and spaced from adjacent portions of the tank, a float movably mounted in said tube, a gauge rod slidably mounted through said cap and having its lower end flattened and passing through said float and clinched thereon, said gauge rod having a flanged upper end adapted to cooperate with the cap for limiting the downward movement of the gauge, and a keeper pivoted on said cap and having portions extending to opposite sides of the pivot point, the portion extending in one direction having manipulating flanges extending upwardly therefrom, the portion extending to the other side of the pivot point being bent upwardly and away from the pivot point to adapt it to engage over the flanged end of the gauge rod, said portion engaging over the gauge rod having flaring lateral extensions adapted to guide said portion onto the gauge rod in either direction.

JAMES E. MORTON.